March 6, 1951   C. N. CRITCHER   2,544,136
HAND CULTIVATING AND WEEDING TOOL
Filed Oct. 25, 1946
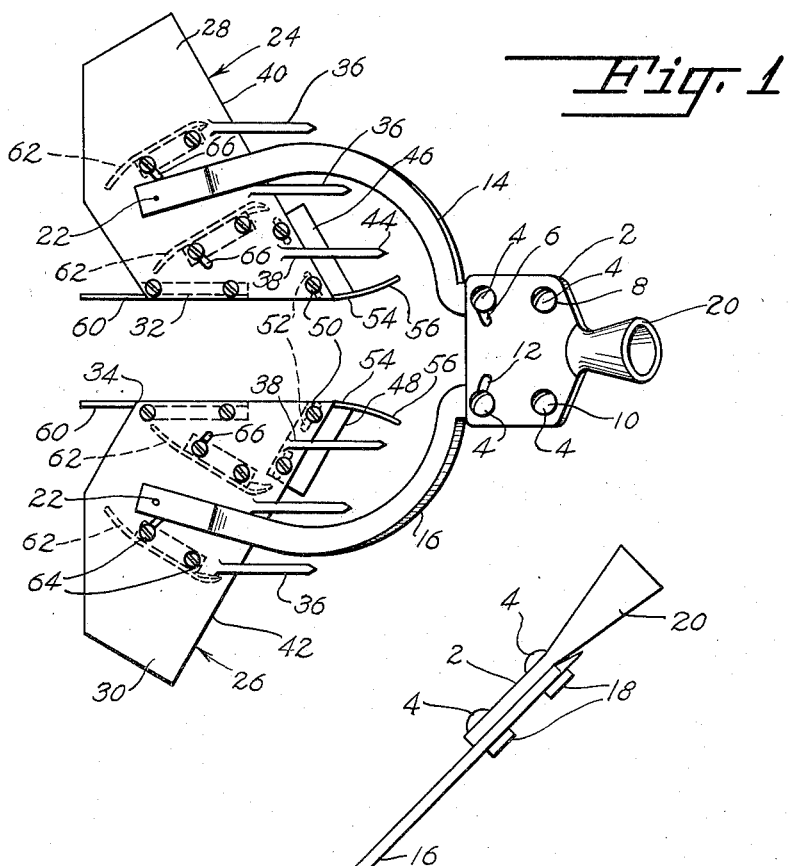
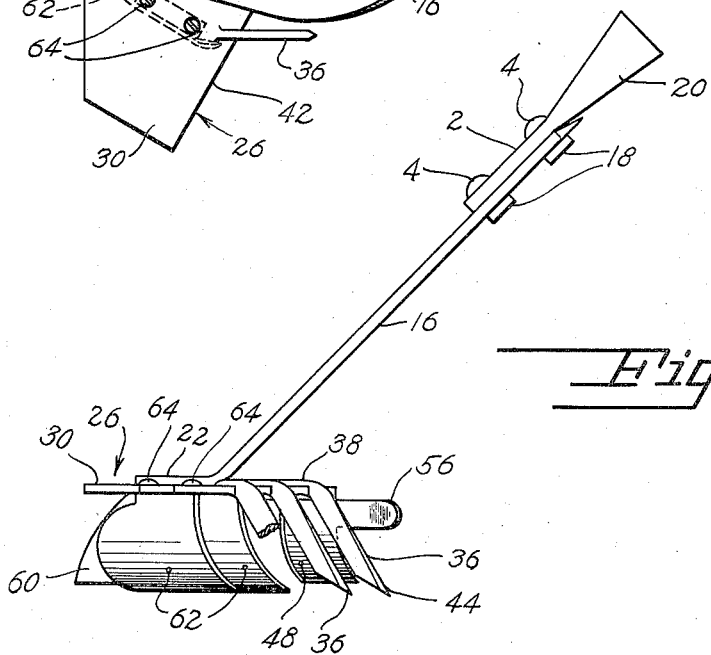
Inventor
Clem N. Critcher
By McMorrow, Berman & Davidson
Attorneys Patented Mar. 6, 1951

2,544,136

UNITED STATES PATENT OFFICE 2,544,136

HAND CULTIVATING AND WEEDING TOOL

Clem N. Critcher, Detroit, Mich.

Application October 25, 1946, Serial No. 705,548

2 Claims. (Cl. 97—71)

This invention relates to cultivators.

An object of the invention is to provide a cultivator which may be pulled by hand or drawn by means of a horse or tractor.

Another object of the invention is to provide a pull type cultivator which is so constructed as to cultivate simultaneously on each side of the row of plants as it is drawn along a row, and which is provided with means for loosening the top crust of the soil, removing the top crust, and for plowing fresh dirt up against both sides of the plants being cultivated.

A further object of the invention is to provide a cultivator which is simple in design, inexpensive to manufacture, and which is effective for the purpose intended.

Other objects and advantages of the invention will become apparent from the following description of a preferred embodiment thereof as illustrated in the accompanying drawings, and in which, Figure 1 is a plan view of my improved cultivator, and Figure 2 is a side elevation of the cultivator shown in Figure 1.

Reference may now be had to the drawings, in which like reference characters denote similar parts throughout the several views. As shown, there is a metal support plate 2 having bolts 4 extending through apertures 6, 8, 10 and 12 formed therein, the bolts also extending through holes formed in support arms 14 and 16 arranged in face-to-face relationship and spaced from each other, the bolts serving to dependingly secure the arms to the plate with the assistance of nuts 18 threaded onto the ends of the bolts.

The apertures 6 and 12 are in the form of arcuate slots, to enable the angle between the arms 14 and 16 to be varied for a purpose which will be further explained below. The plate 2 also is provided with a hollow ferrule 20 for the reception of one end of a handle, not shown, by which the cultivator may be drawn or pulled along. Each of the arms 14 and 16 has secured to its forward end 22, a cultivator section, there being a right hand cultivator section 24, and a left hand cultivator section 26. Each section includes a horizontally-disposed cultivator section plate, shown at 28 and 30, the plates being arranged in diverging relationship and having their edges 32 and 34 spaced from each other. Inasmuch as the arms 14 and 16 are connected at their ends 22 to the surface of their respective cultivator plates 28 and 30, it is apparent that changing the angle between the arms, will also vary the spacing between the edges 32 and 34 of the two plates.

Each cultivator plate has a number of parallel rake teeth 36 secured at their upper ends 38 to the leading edges 40 and 42 of the plates 28 and 30, the teeth being curved as shown and having forwardly pointed sharpened leading ends 44 for digging into and loosening the top crust of the soil on both sides of the plants as the cultivator is drawn along the row, the plant row being in the space between the edges 32 and 34 of the plates 28 and 30.

It will be observed that the teeth 36 are secured to the upper surfaces of the plates 28 and 30, and there are also secured to the lower surfaces of the plates, and extending from the inner-side edge of each of the plates 28 and 30 along a portion of the leading edges 40 and 42, hoe plates 46 and 48. The hoe plates have for their purpose the removal of the old top soil which has been loosened by the teeth 36, and are so bent and curved as to remove the said soil to each side of the plant row and away from the plants. The hoe plates 46 and 48 are secured to the plates 28 and 30 by means of bolts 50 extending through holes in the plates 28 and 30, and also through elongated slots 52 formed in the hoe plates, thus enabling the hoe plates to be moved in a direction parallel to their respective leading cultivator plate edges 40 and 42 and hence are adjustable as to their positions. Each hoe plate has its inner edge 54 bent forwardly to form a tongue 56 for guiding any plants that may have grown with crooked stems and to help prevent injury to them as they are being cultivated. It is also intended to help lift up and guide the leaves of bushy type plants and to help avoid injury to them.

Soil guiding plates 60 are also secured to the trailing edges 32 and 34 of the cultivator plates by means of screws, as shown, these plates lying in planes substantially at right angles to the cultivator plates. The cultivator sections are also provided with plow plates 62 secured to and depending from the undersurface of the cultivator plates 28 and 30, four such plow plates being shown. These plates are disposed to the rear of the cultivator teeth and hoe plates, and, hence, serve for the purpose of moving fresh earth inwardly toward the plants to replace that removed by the teeth and hoe plates. For this purpose the plow plates are curved inwardly as best shown in Figure 2, and are attached to the plates 28 and 30 by means of screws 64 extending through holes in the upper flanges of the plow plates and through apertures formed in the cultivator plates 28 and 30.

It will be observed that the rearward apertures 66 in the plates 28 and 30 are in the form of arcuate slots, in order to allow the plow plates to be pivoted on the forward bolts of the plow plates and thus enable their angles relative to the edges 32 and 34 of the cultivator plates to be varied as desired, to increase or decrease the plowing effect which throws the earth inwardly toward the plant rows.

The cultivator shown is quite versatile and efficient in operation, and will perform the operations described, all at the same time, while being drawn along the plant rows, with the latter passing between the plates 60, and while causing no disturbance to the plants at all, and cultivating on both sides of the plants simultaneously. While shown as a pull cultivator, it is obvious that it may also be readily converted for use as a push cultivator.

Although I have described a preferred embodiment of my invention in specific terms, it is to be understood that various changes may be made in size, shape, materials and arrangement without departing from the spirit and scope of the invention as claimed.

I claim:

1. A cultivator comprising a pair of horizontal plates, a pair of divergent arms, means securing the convergent ends of said arms together for connection to a handle, means securing the divergent ends of said arms separately to said horizontal plates whereby said plates are supported in laterally spaced relation, said plates having laterally inward edges spaced parallel to each other at a distance to permit passage therebetween of plants of a row as the cultivator is drawn rearwardly along the row, said horizontal plates having forwardly divergent rear edges, laterally spaced rake teeth secured to depend along said rear edges of each plate, and hoe plates depending from each of said plates near the inward edges thereof and extending along the rear edges thereof forwardly of some of said rake teeth, vertical longitudinal soil guiding plates depending from each of said horizontal plates and extending along the inward edges of said horizontal plates, and rearwardly divergent plant guide portions on said horizontal plates rearwardly of said soil guiding plates for guiding plants into the space between said soil guiding plates and the inward edges of said horizontal plates.

2. A cultivator comprising a pair of horizontal plates, a pair of divergent arms, means securing the convergent ends of said arms together for connection to a handle, means securing the divergent ends of said arms separately to said horizontal plates whereby said plates are supported in laterally spaced relation, said plates having laterally inward edges spaced parallel to each other at a distance to permit passage therebetween of plants of a row as the cultivator is drawn rearwardly along the row, said horizontal plates having forwardly divergent rear edges, laterally spaced rake teeth secured to depend along said rear edges of each plate, and hoe plates depending from each of said plates near the inward edges thereof and extending along the rear edges thereof forwardly of some of said rake teeth, rearwardly divergent plow plates depending from each of said horizontal plates, said plow plates being laterally spaced from each other on each horizontal plate, said plow plates having rear ends positioned substantially in longitudinal alignment with said rake teeth and forward ends displaced laterally inwardly toward the inward edges of said horizontal plates.

CLEM N. CRITCHER.

REFERENCES CITED

The following references are of record in the file of this patent:

UNITED STATES PATENTS

| Number | Name | Date |
|---|---|---|
| 311,503 | Marshall | Feb. 3, 1885 |
| 387,333 | Allen | Aug. 7, 1888 |
| 753,830 | Lemm | Mar. 1, 1904 |